(12) United States Patent
Bhargava et al.

(10) Patent No.: US 7,761,596 B2
(45) Date of Patent: Jul. 20, 2010

(54) ROUTER AND METHOD FOR SERVER LOAD BALANCING

(75) Inventors: Anurag Bhargava, Cary, NC (US); Santosh Kolenchery, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 873 days.

(21) Appl. No.: 11/427,893

(22) Filed: Jun. 30, 2006

(65) Prior Publication Data

US 2008/0005293 A1 Jan. 3, 2008

(51) Int. Cl.
*G06F 15/173* (2006.01)
(52) U.S. Cl. .................................. 709/238; 709/226
(58) Field of Classification Search .............. 709/223, 709/226, 238, 239, 240, 241, 242
See application file for complete search history.

(56) References Cited

U.S. PATENT DOCUMENTS

| 6,772,211 | B2 * | 8/2004 | Lu et al. ..................... 709/226 |
| 7,062,571 | B1 * | 6/2006 | Dale et al. .................. 709/239 |
| 2007/0162968 | A1 * | 7/2007 | Ferreira et al. .............. 726/12 |

FOREIGN PATENT DOCUMENTS

EP    1469653 A2    10/2004

\* cited by examiner

*Primary Examiner*—Ramy M Osman
*Assistant Examiner*—Marshall McLeod
(74) *Attorney, Agent, or Firm*—Roger S. Burleigh

(57) ABSTRACT

A router and method are described herein which distribute traffic/incoming packets across a network of servers by using stateful load balancing filters (e.g., application filter(s), dynamic filter(s), firewall filter(s)) which are located on a dataplane/fastpath.

8 Claims, 3 Drawing Sheets

ROUTER AND METHOD FOR SERVER LOAD BALANCING

BACKGROUND OF THE INVENTION

1. Field of the Invention

The present invention relates to a router and a method for using stateful load balancing filters which are located on a dataplane (fastpath) to distribute traffic/packets across a network of servers.

2. Description of Related Art

The following abbreviations are herewith defined, at least some of which are referred to in the ensuing description of the prior art and the preferred embodiment of the present invention.

| | |
|---|---|
| CAM | Content Addressable Memory |
| DST | Destination |
| FTP | File Transfer Protocol |
| HTTP | Hyper Text Transfer Protocol |
| TCP | Transmission Control Protocol |
| SAP | Service Advertising Protocol |
| SRC | Source |
| ID | Identification |
| IP | Internet Protocol |
| ISP | Internet Service Provider |

The Internet is a global system of computer networks which connects millions of users worldwide by using a communications protocol called TCP/IP. People and businesses around the world can use the Internet to retrieve information, correspond with other Internet users, conduct business globally, and access a vast array of services and resources. The number of Internet users worldwide is believed to be more than 650 million and this number is growing rapidly. As a result of this growth, the search engines, ISPs, and high volume websites all have to deal with increasing numbers of users and increasing numbers of requests.

A system administrator can deal with these demands by purchasing a large server, but even the most powerful and expensive server can eventually fail or become overloaded with a large number of requests. As such, the system administrator typically creates a network server cluster, which consists of a group of servers which all have a common virtual IP address. To handle a large number of requests, it is necessary to employ a load balancing scheme to distribute the requests evenly across the group, or cluster, of commonly addressed servers. Thus, when one server is handling multiple user requests, then a new request could be forwarded to another server which has more capacity. Examples of two load balancing schemes which have been used in the past are discussed next with respect to FIGS. 1 and 2 (PRIOR ART).

Referring to FIG. 1 (PRIOR ART), there is a block diagram which is used to explain how one traditional load balancing scheme directs an incoming packet to a lightly loaded server which is located within a server farm. In this scheme, the router 102 receives a HTTP packet 104 (associated with a stream of HTTP packets) and then dispatches the HTTP packet 104 to a load director 106 (e.g., Cisco's load director 106). The load director 106 analyzes the HTTP packet 104 and determines that the HTTP packet 104 should be sent to the lightly loaded HTTP server 108a (for example). In this example, the load director 106 chooses the lightly loaded HTTP server 108a from multiple HTTP servers 108a, 108b . . . 108n and multiple FTP servers 110a, 110b . . . 110n. Then, the load director 106 forwards the HTTP packet 104 to the router 102 which sends the HTTP packet 104 to the lightly loaded HTTP server 108a. A problem with this load balancing scheme is that it requires the use of a remote load director 106. Moreover, this load balancing scheme introduces a significant amount of processing delay because the HTTP packet 104 must travel from the router 102 to the load director 106 and then back to the router 102 before being sent to the light loaded HTTP server 108a. This is not desirable.

Referring to FIG. 2 (PRIOR ART), there is a block diagram which is used to explain how another traditional load balancing scheme directs an incoming packet to a lightly loaded server which is located within a server farm. In this scheme, the router 202 receives a HTTP packet 204 (associated with a stream of HTTP packet) on a fastpath 206 (dataplane 206) and forwards the HTTP packet 204 to a slowpath 208 (Level 4 208). The slowpath 208 implements a server selection algorithm (e.g., round robin, least number of connections) which selects a lightly loaded HTTP server 210b (for example) that should receive the HTTP stream 204. In this example, the server selection algorithm selects the lightly loaded HHTP server 210b from multiple HTTP servers 210a, 210b . . . 210n and multiple FTP servers 212a, 212b . . . 212n. Then, the router 202 sends the HTTP packet 204 back to the fastpath 206 and from there the HTTP packet 204 is directed to the lightly loaded HTTP server 210b. A problem with this load balancing scheme is that it introduces a significant amount of processing delay especially when each packet 204 (one shown) in the HTTP session needs to be processed up in the slowpath 208. Accordingly, there is a need for a load balancing scheme which can effectively direct an incoming packet to a lightly loaded server located in a server farm. This need and other needs are addressed by the present invention.

BRIEF DESCRIPTION OF THE INVENTION

A router and a load balancing method are described herein which can efficiently distribute traffic/incoming packets across a network of servers. In one embodiment, the router has three types of stateful load balancing filters including an application filter(s), a dynamic filter(s) and a firewall filter(s). The stateful load balancing filters are located on a dataplane/fastpath and function to evenly distribute traffic/incoming packets across a network of servers. In particular, the application filter(s) creates the dynamic filter(s) which redirects the matching traffic/incoming packets to lightly loaded server(s) located in a server farm. And, the firewall filter(s) drops the traffic/incoming packets which do not match anyone of the application filter(s) or anyone of the previously created dynamic filter(s). Plus, the router can use periodic probes to communicate with the configured servers to ascertain their availability where this information is then used when choosing an appropriate server at which to send the traffic/incoming packet.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 3:
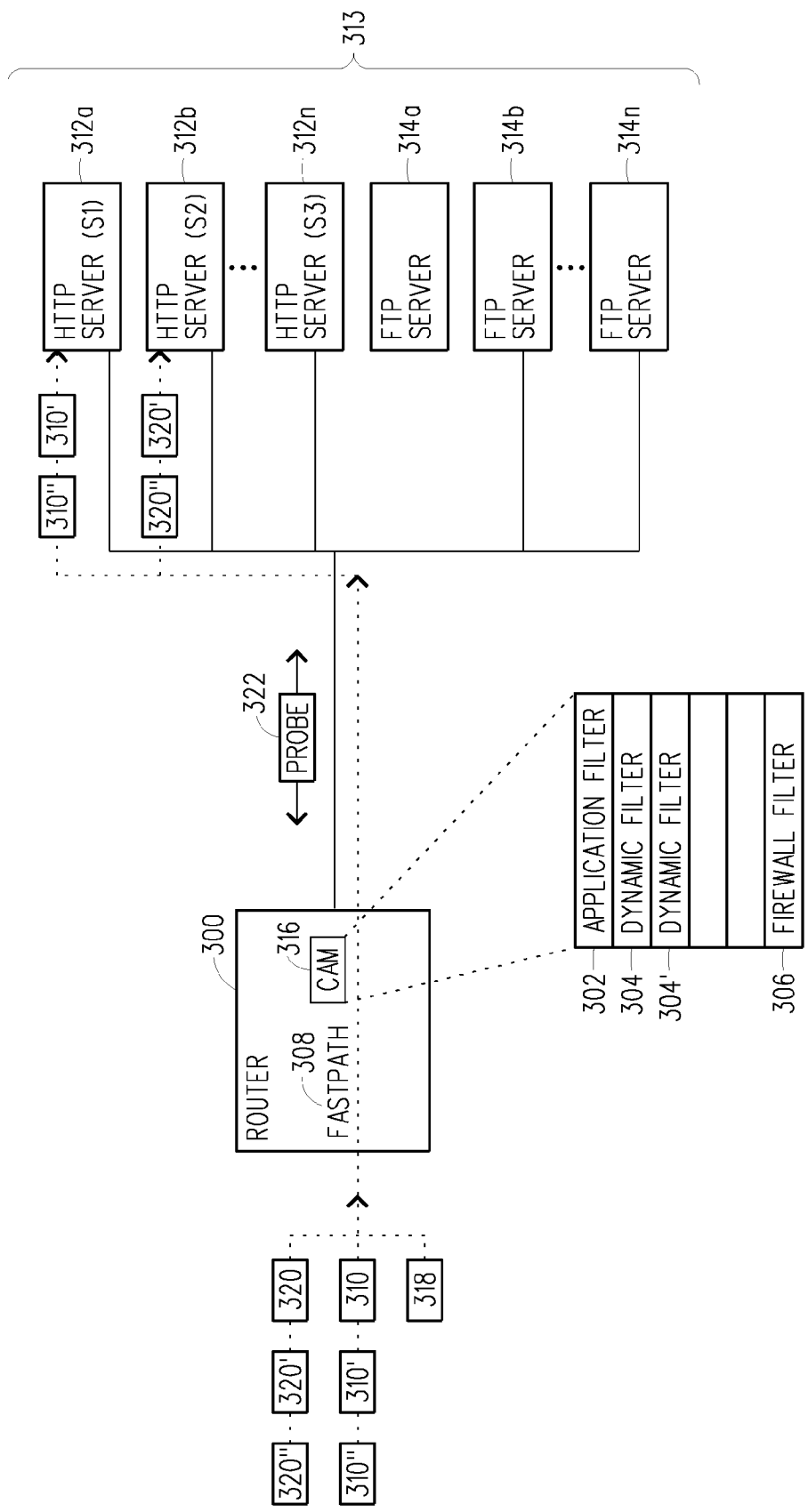
FIG. 3 is a block diagram of a router which uses stateful load balancing filters located on a dataplane (fastpath) to analyze and redirect an incoming packet to a lightly loaded server which is located within a server farm in accordance with the present invention.

Referring to FIG. 3, there is a block diagram of a router 300 which uses stateful load balancing filters 302, 304 and 306 located on a dataplane 308 (fastpath 308) to analyze an incoming packet 310 (for example) and then redirect the subsequent incoming packets 310' and 310" (for example) to a lightly loaded server 312a (for example) which is part of a server farm 313. Basically, the router 300 receives an incoming packet 310 and then uses a CAM 316 which has a stateful/ statistics function on fastpath 308 to inspect data in the incoming packet 310 and then performs a load balancing function. In particular, the CAM 316 has an application filter 302 (parent filter 302) which maintains the state and statistics of multiple HTTP servers 312a, 312b . . . 312n (there would be a separate application filter associated with the family of FTP servers 314a, 314b . . . 314n). And, when the application filter 302 receives a matching incoming packet 310 it uses the stateful/statistics function to create a dynamic filter 304 (secondary filter 304) and select a lightly loaded server 312a (for example). The dynamic filter 304 has an action function which will redirect the future incoming packets 310' and 310" (associated with incoming packet 310) to the selected lightly loaded server 312a (for example). In addition, the CAM 316 has a firewall filter 306 (wildcard filter 306) which drops an incoming packet 318 (e.g., FTP packet 318) that does not match the application filter 302 or the dynamic filter 304. An exemplary scenario is provided next to help illustrate the different functions, capabilities, and advantages of the present invention.

In the exemplary scenario, it is assumed that HTTP traffic (e.g., HTTP incoming packets 310, 310' and 310") are load balanced among three HTTP servers S1, S2 and S3 (shown as HTTP servers 312a, 312b, and 312n). And, the application filter 302 is assumed to implement a server calculation algorithm that is based on round robin scheme. Alternatively, the application filter 302 could implement a server calculation algorithm that is based, for example, on a least number of connections scheme or a server service rate scheme. At step 1, the CAM 316 would look as follows:

| | | CAM 316 (step 1) | | |
|---|---|---|---|---|
| CAM ID*** | SRC IP Addr.* | DST IP Addr.* | Protocol* | Action Field (Logic for Server Choice) |
| 1 HTTP (application filter 302) | ANY | www.ericsson.com** (1.1.1.1) | TCP | Create dynamic filter 304 RRR: S1, S2, S3 |
| 2 (firewall filter 306) | ANY | ANY | ANY | DROP |

*Matching Keys
**The use of www.ericsson.com is exemplary.
***The filters 302, 304 and 306 are arranged according to their respective priorities within the CAM 316. In this case, the application filter 302 has a higher priority than the firewall filter 306.

The CAM 316 receives the first incoming packet 310 which is a TCP packet (associated with a HTTP connection) with a SRC IP Addr.=a.b.c.d and a DST IP Addr.=1.1.1.1. The incoming packet 310 matches the application filter 302 because it satisfies the matching key where SRC IP Addr.=ANY, DST IP Addr.=www.ericsson.com (1.1.1.1) and Protocol field=TCP. The application filter 302 then creates a dynamic filter 304 which has an action field with instructions to "redirect to server S1". The application filter 302 selects server S1 because none of the servers S1, S2 and S3 have been previously selected by the round robin server selection algorithm. At step 2, the CAM 316 looks as follows:

| | | CAM 316 (step 2) | | |
|---|---|---|---|---|
| CAM ID*** | SRC IP Addr.* | DST IP Addr. | Protocol* | Action Field (Logic for Server Choice) |
| 1 (dynamic filter 304)**** | a.b.c.d | www.ericsson.com** (1.1.1.1) | HTTP | Redirect to Server S1 |
| 2 HTTP (application filter 302) | ANY | www.ericsson.com** (1.1.1.1) | TCP | Create dynamic filter 304 RRR: S1, S2, S3 |
| 3 (firewall filter 306) | ANY | ANY | ANY | DROP |

*Matching Keys
**The use of www.ericsson.com is exemplary.
***The filters 302, 304 and 306 are arranged according to their respective priorities within the CAM 316. In this case, the dynamic filter 304 has a higher priority than the application filter 302 which has a higher priority than the firewall filter 306.
****The secondary filter 304 is dynamic in nature in that it is dynamically created when needed and only kept for a short amount of time before it is destroyed.

The router 300 receives HTTP packets 310' and 310" that contain a SRC IP Addr.=a.b.c.d and a DST IP Addr.=1.1.1.1 which means they will match the dynamic filter 304 (the first filter checked). The dynamic filter 304 has an action field with instructions that redirects the HTTP packets 310' and 310" to server S1. At this point, server S1 has been assigned to service one traffic stream 310, 310' and 310", and the remaining servers S2 and S3 have not yet been assigned to service a traffic stream.

The router 300 now receives an incoming packet 320 which is a TCP packet (associated with a HTTP connection) with a SRC IP Addr.=e.f.g.h and a DST. IP Addr.=1.1.1.1. The incoming packet 320 does not match the first dynamic filter 304 (the first filter checked) because there is a difference between the SRC IP Addr.=a.b.c.d (in dynamic filter 304) and the SRC IP Addr.=e.f.g.h (in incoming packet 320). However, the incoming packet 320 does match the application filter 302 (the second filter checked) because it satisfies the matching key which includes SRC IP Addr.=ANY, DST IP Addr.=www.ericsson.com (1.1.1.1) and Protocol field=TCP. The application filter 302 then creates a new dynamic filter 304' which has an action field with instructions to "redirect to server S2". In this case, the application filter 302 used the round robin server selection algorithm to select server S2. At step 3, the CAM 316 would look as follows:

| | | CAM 316 (step 3) | | |
|---|---|---|---|---|
| CAM ID*** | SRC IP Addr.* | DST IP Addr. | Protocol* | Action Field (Logic for Server Choice) |
| 1 (dynamic filter | a.b.c.d | www.ericsson.com** (1.1.1.1) | HTTP | Redirect to Server S1 |

-continued

CAM 316 (step 3)

| CAM ID*** | SRC IP Addr.* | DST IP Addr. | Protocol* | Action Field (Logic for Server Choice) |
|---|---|---|---|---|
| 304)**** 2 (dynamic filter 304')**** | e.f.g.h | www.ericsson.com** (1.1.1.1) | HTTP | Redirect to Server S2 |
| 3 HTTP (application filter 302) | ANY | www.ericsson.com** (1.1.1.1) | TCP | Create dynamic filter 320 RRR: S1, S2, S3 |
| 4 (firewall filter 306) | ANY | ANY | ANY | DROP |

*Matching Keys.
**The use of www.ericsson.com is exemplary.
***The filters 302, 304 and 306 are arranged according to their respective priorities within the CAM 316. In this case, the dynamic filter 304 has a higher priority than dynamic filter 304' which has a higher priority than application filter 302 which has a higher priority than the firewall filter 306.
****The secondary filters 304 and 304' are dynamic in nature in that they are dynamically created when needed and kept for a short amount of time before they are destroyed.

The router 300 receives HTTP packets 320' and 320" that contain a SRC IP Addr.=e.f.g.h and a DST IP Addr.=1.1.1.1 which means they will match the second dynamic filter 304' (the second filter checked). The second dynamic filter 304' has an action field with instruction that redirects the HTTP packets 320' and 320" to server S2. At this point, server S1 is servicing traffic stream 310, 310' and 310", server S2 is servicing traffic stream 320, 320' and 320", and server 3 has not yet been assigned to service a traffic stream.

The router 300 now receives an incoming packet 318 (not a TCP packet) which has a SRC IP Addr.=h.i.j.k. and a DST. IP Addr.=www.MSN.com (2.2.2.2.). The incoming packet 318 does not match the application filter 302 nor does it match anyone of the configured secondary filters 304 and 304'. However, the incoming packet 318 does match the firewall filter 306 which has an action field with instructions to drop the incoming packet 318. As can be seen, the firewall filter 322 (the lowest priority filter) provides a secure firewall.

The application filter 302 is able to select the lightly load servers S1 and S2 which are used by dynamic filters 304 and 304', because it keeps track of the rate and number of requests (sessions) which are redirected to each server S1, S2 and S3. For instance, the application filter 302 would keep track of the load on each server S1, S2 and S3 by using probe(s) 322 (HTTP probe 328) which communicates with and ascertains the load of the servers 312a, 312b . . . 312n, 314a, 314b . . . 314n. Because, the application filter 302 maintains statistics about the aggregate load per each server S1, S2 and S3, it can make an intelligent decision when selecting the best available/lightly loaded server S1, S2 or S3. This capability is highly desired because if the application filter 302 is not aware that one of the servers 312a, 312b . . . 312n, 314a, 314b . . . 314n has malfunctioned it could redirect new requests to this server which would lead to an unsuccessful connection.

In addition, the application filter 302 could have the functionality to keep track of the total number of requests (sessions) which are currently being redirected to servers S1, S2 and S3. If this is done, then the application filter 302 could use this information to help counter a SYN attack in which a malicious user sends numerous requests (new incoming packets) in an attempt to overload/shutdown the servers S1, S2 and S3. For instance, the application filter 302 could counter a SYN attack by incrementing a counter by "1" every time a new incoming packet 310 (for example) associated with a new session is accepted and a secondary filter 304 (for example) is subsequently created. Once, a threshold is reached, then the application filter 302 upon receiving a new incoming packet will not create a secondary filter but instead it will drop the new incoming packet. This is a desirable feature.

Figure 4:
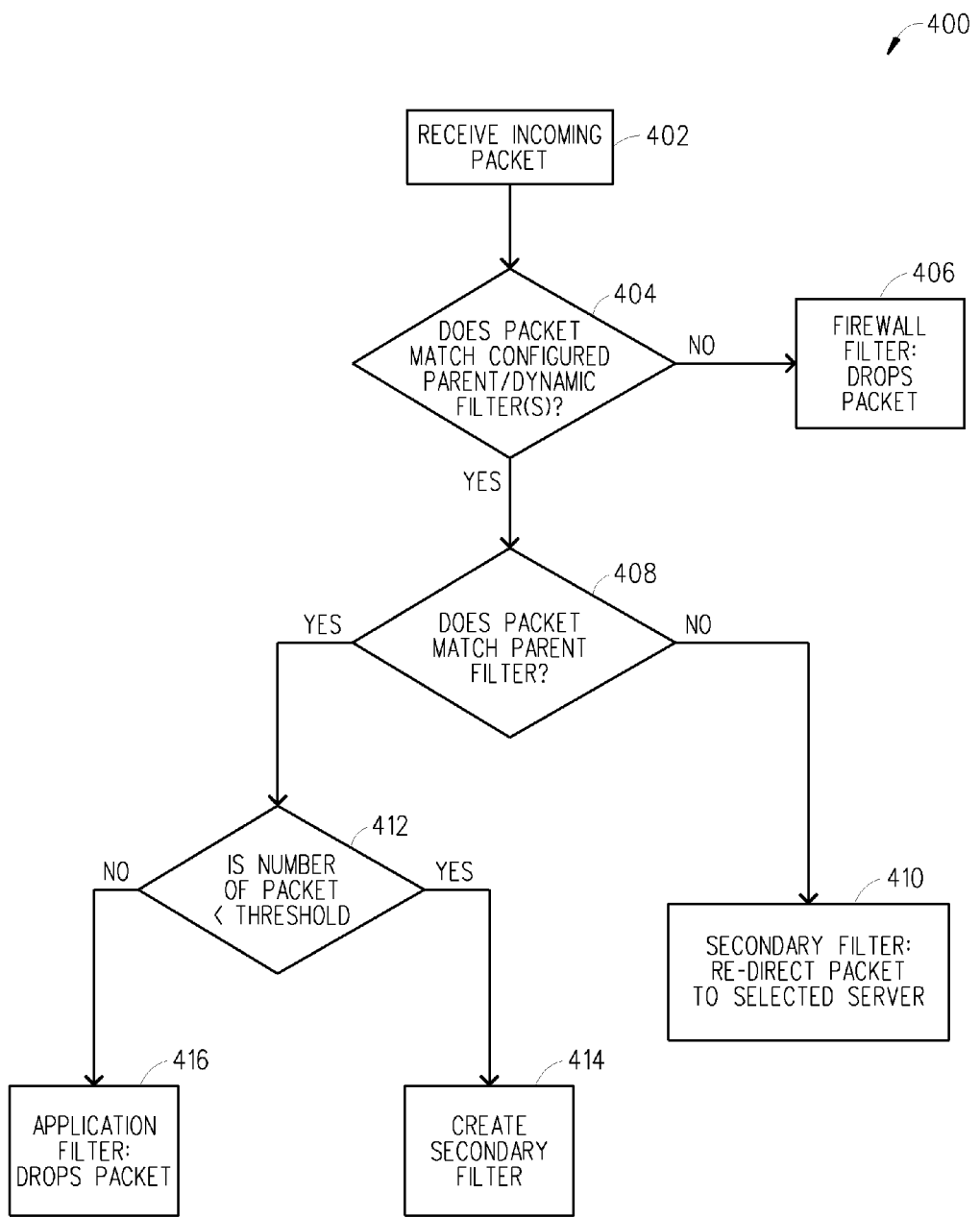
FIG. 4 is a flowchart that illustrates the steps of a method for analyzing and redirecting an incoming packet to a lightly loaded server which is located within a server farm in accordance with the present invention.

Referring to FIG. 4, there is a flowchart that illustrates the steps of a method 400 for analyzing and redirecting an incoming packet to a lightly loaded server which is part of a server farm in accordance with the present invention. First, the router 300 receives an incoming packet "X" (e.g., incoming packets 310, 310', 310", 318, 320, 320', 320")(step 402). Then, the router 300 determines if the incoming packet "X" matches an application filter 302 (multiple application filters 302 can be used depending on the number of supported application protocols such as HTTP, FTP, SAP etc . . . ) or a previously configured secondary filter 304 and 304' (step 404). If not, then the firewall filter 306 functions as a secure firewall and drops the incoming packet "X" (e.g., incoming packet 318)(step 406). If yes, then the router 300 checks if the incoming packet "X" matched an application filter 302 (step 408). If no, then a configured dynamic filter 304 or 304' redirects the incoming packet "X" (e.g., incoming packet 310' or 320') to a chosen remote server (e.g., server S1 or S2)(step 410). If yes, then the application server 302 determines if the total number of incoming packets "X" (associated with new sessions) which have been received is less than a predetermined threshold (step 412). If yes, then the application filter 302 creates a new dynamic filter and assigns it a lightly loaded server (step 414). If not, then the application filter 302 would implement action logic with instructions therein that drops the incoming packet "X" (step 416). As can be seen, the method 400 has steps which are slightly different than the exemplary scenario described above with respect to FIG. 3. This was done to illustrate that there are several ways one could implement the present invention.

Figure 1:
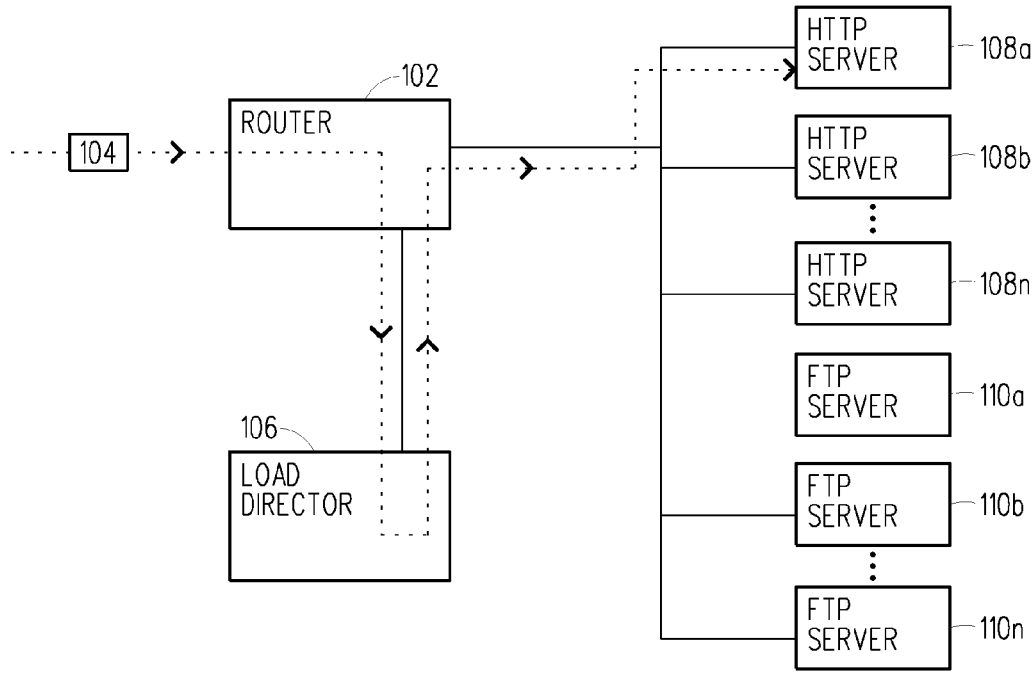
FIG. 1 (PRIOR ART) is a block diagram which is used to explain how one traditional load balancing scheme directs an incoming packet to a lightly loaded server which is located within a server farm.
Figure 2:
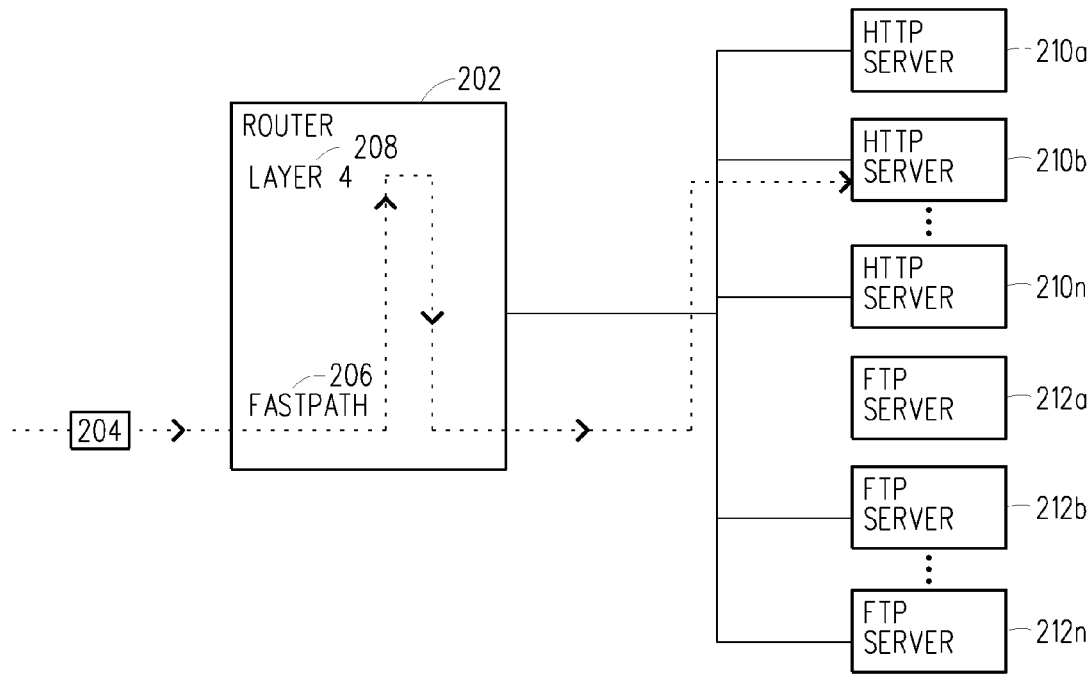
FIG. 2 (PRIOR ART) is a block diagram which is used to explain how another traditional load balancing scheme directs an incoming packet to a lightly loaded server which is located within a server farm.

From the foregoing, it should be appreciated that the router 300 and method 400 use stateful load balancing filters 302, 304 and 306 located on a dataplane 308 (fastpath 308) to balance loads at servers 312a, 312b . . . 312n. The stateful load balancing filters 302, 304 and 306 improve the performance of the servers 312a, 312b . . . 312n and at the same time provide a firewall functionality. The router 300 and method 400 have many desirable features and advantages several of which have been listed below:

The load balancing scheme is performed within one device—router 300. No other device like the load director 106 shown in FIG. 1 is needed.

The dynamic filtering is created in fastpath. And, various custom server selection algorithms could be easily incorporated.

Firewall security is provided by installing a wildcard filter 322 (lowest priority filter) which has an action field that drops the non-matching incoming traffic.

The load balancing scheme can use more than one application filter depending on the number of protocols (e.g., HTTP, FTP, SAP) supported by the servers.

The router 300 could take an incoming packet and transfer it from fastpath 308 to slowpath (Level 4) if more processing was needed to select a lightly loaded server.

Although one embodiment of the present invention has been illustrated in the accompanying Drawings and described in the foregoing Detailed Description, it should be understood that the invention is not limited to the disclosed embodiment, but is capable of numerous rearrangements, modifications and substitutions without departing from the spirit of the invention as set forth and defined by the following claims.

What is claimed is:

1. A method for redirecting incoming packets to a plurality of servers comprising the steps of:
receiving an incoming packet;
determining if the incoming packet matches an application filter or a dynamic filter;
if not, then a firewall filter drops the incoming packet;
if yes, then determining if the incoming packet matched the application filter;
if not, then the incoming packet matches the dynamic filter which redirects the incoming packet to a chosen server; and
if yes, then the application filter creates a new dynamic filter which redirects future incoming packets associated with the incoming packet to a new chosen remote server;
wherein said application filter includes:
a source IP address field;
a destination IP address field;
a protocol field; and
an action field;
wherein said dynamic filter includes:
a source IP address field;
a destination IP address field;
a protocol field; and
an action field which has action logic that redirects the incoming packet to the chosen server; and,
wherein said firewall filter includes:
a source IP address field;
a destination IP address field;
a protocol field; and,
an action field with action logic that drops the incoming packet.

2. The method of claim 1, wherein said application filter has action logic that drops the incoming packet when a threshold for a number of new incoming packets has been exceeded.

3. The method of claim 1, wherein said application filter further includes a server selection logic that maintains load status information for the plurality of servers.

4. The method of claim 3, wherein the load status information is obtained in part from probes which communicate with the plurality of servers to ascertain an availability of each of the servers.

5. A router, comprising:
a content addressable memory which has load balancing filters stored therein that are located on a dataplane, said load balancing filters include:
an application filter;
a dynamic filter; and
a firewall filter, where said load balancing filters facilitate the following:
determining if an incoming packet matches one or more predetermined fields in said dynamic filter;
if yes, then said dynamic filter redirects the incoming packet to a chosen server;
if no, then determining if the incoming packet matches one or more predetermined fields in said application filter;
if yes, then said application filter creates a new dynamic filter which redirects future incoming packets associated with the incoming packet to a new chosen server; and
if no, then said firewall filter drops the incoming packet;
wherein said application filter includes:
a source IP address field;
a destination IP address field;
a protocol field; and
an action field;
wherein said dynamic filter includes:
a source IP address field;
a destination IP address field;
a protocol field; and,
an action field which has action logic that redirects the incoming packet to the chosen server; and,
wherein said firewall filter includes:
a source IP address field;
a destination IP address field;
a protocol field; and,
an action field with action logic that drops the incoming packet.

6. The router of claim 5, wherein said application filter drops the incoming packet when a threshold for a number of new incoming packets has been exceeded.

7. The router of claim 5, wherein said application filter further includes a server selection logic that maintains load status information for a plurality of servers.

8. The router of claim 5, wherein said application filter uses probes which communicate with a plurality of servers to ascertain an availability of each of the servers where the availability information is later used when choosing the chosen server at which to send the incoming packet.

* * * * *